United States Patent
Tada et al.

(10) Patent No.: US 11,279,828 B2
(45) Date of Patent: Mar. 22, 2022

(54) SILICONE RUBBER COMPOSITE MATERIAL AND VIBRATION ISOLATING MEMBER

(71) Applicants: DENSO CORPORATION, Kariya (JP); SHINSHU UNIVERSITY, Matsumoto (JP)

(72) Inventors: Kazuhiro Tada, Kariya (JP); Haruhisa Shibata, Kariya (JP); Ryo Miyahara, Kariya (JP); Hisayoshi Oshima, Kariya (JP); Toru Noguchi, Nagano (JP)

(73) Assignees: DENSO CORPORATION, Kariya (JP); SHINSHU UNIVERSITY, Nagano (JP)

( * ) Notice: Subject to any disclaimer, the term of this patent is extended or adjusted under 35 U.S.C. 154(b) by 218 days.

(21) Appl. No.: 16/640,685

(22) PCT Filed: Jul. 12, 2018

(86) PCT No.: PCT/JP2018/026265
§ 371 (c)(1),
(2) Date: Feb. 20, 2020

(87) PCT Pub. No.: WO2019/039125
PCT Pub. Date: Feb. 28, 2019

(65) Prior Publication Data
US 2020/0354573 A1  Nov. 12, 2020

(30) Foreign Application Priority Data
Aug. 24, 2017 (JP) .............................. JP2017-161570

(51) Int. Cl.
*C08K 3/04* (2006.01)
*C08L 83/04* (2006.01)
*F16F 15/04* (2006.01)

(52) U.S. Cl.
CPC .............. *C08L 83/04* (2013.01); *C08K 3/041* (2017.05); *F16F 15/04* (2013.01); *C08K 2201/003* (2013.01)

(58) Field of Classification Search
CPC ................................ C08L 83/04; C01B 32/158
See application file for complete search history.

(56) References Cited

U.S. PATENT DOCUMENTS

| 2015/0123043 A1 | 5/2015 | Nagamune et al. | |
| 2015/0329705 A1* | 11/2015 | Ueki | C08K 3/04 524/496 |

FOREIGN PATENT DOCUMENTS

| EP | 2851398 A1 | 3/2015 |
| JP | 2007009073 A | 1/2007 |
| JP | 4394659 B2 | 1/2010 |
| JP | 4456576 B2 | 4/2010 |
| JP | 2010138949 A | 6/2010 |
| JP | 5639329 B2 | 12/2014 |
| JP | 5670817 B2 | 2/2015 |
| JP | 2015052179 A | 3/2015 |
| JP | 5763991 B2 | 8/2015 |
| JP | 5844064 B2 | 1/2016 |
| JP | 2017-082145 A | 5/2017 |
| WO | WO-2019039124 A1 | 2/2019 |

* cited by examiner

*Primary Examiner* — Kuo Liang Peng
(74) *Attorney, Agent, or Firm* — Harness, Dickey & Pierce, P.L.C.

(57) ABSTRACT

A silicone rubber composite material includes silicone rubber, first carbon nanotubes having an average diameter of not more than 30 nm, and second carbon nanotubes having an average diameter of more than 30 nm and not more than 1000 nm. Per 100 parts by weight of the silicone rubber, 2.5 to 10 parts by weight of the first carbon nanotubes and 5 to 15 parts by weight of the second carbon nanotubes are included.

7 Claims, 13 Drawing Sheets

FIG. 1

| | BLEND NO. | | SMP 1 GLE 101 | SMP 2 GKE 102 | SMP 3 GKE 120 | EVALUATION CRITERIA ○: Good ×: Bad |
|---|---|---|---|---|---|---|
| CONSTITUENT MATERIAL TYPE | KE5560-U | phr | 100 | 100 | 100 | |
| | NC7000 | phr | 2.5 | 2.5 | 5 | |
| | EXPANDED GRAPHITE/ PF POWDER | phr | 5 | 10 | 2.5 | |
| | VGCF-H | phr | 0 | 0 | 0 | |
| MATERIAL CHARACTERISTIC (PHYSICAL PROPERTY VALUE) | ATTENUATION | $\tan\delta$ (0°C) | 0.39 | 0.42 | 0.41 | |
| | | $\tan\delta$ (80°C) | 0.30 | 0.31 | 0.28 | |
| | SSM G' (STORAGE SHEAR MODULUS G') | G' (0°C) MPa | 17 | 21 | 20 | |
| | | G' (80°C) MPa | 7 | 9 | 10 | |
| | | G' (0°C)/G' (80°C) | 2.5 | 2.3 | 2.0 | |
| | FATIGUE DURABILITY | NUMBER OF TIMES LOAD 3N/mm | 1379 | 4105 | 18000 | |
| | T2n/ PULSE NMR | $\mu$ sec (120°C) | 3120 | 3250 | 2900 | |
| | fnn/ PULSE NMR | (120°C) | 0 | 0 | 0.15 | |
| EVALUATION | ATTENUATION | $\tan\delta$ (0°C) | ○ | ○ | ○ | ≥ 0.30 |
| | | $\tan\delta$ (80°C) | ○ | ○ | × | ≥ 0.30 |
| | SSM G' (STORAGE SHEAR MODULUS G') | G' (0°C) | ○ | ○ | ○ | ≥ 10 MPa |
| | | G' (80°C) | ○ | ○ | ○ | ≥ 5 MPa |
| | | G' (0°C)/G' (80°C) | ○ | ○ | ○ | < 3 |
| | FATIGUE DURABILITY | NUMBER OF TIMES LOAD 3N/mm | ○ | ○ | ○ | ≥ 1000 TIMES |
| | T2n/ PULSE NMR | $\mu$ sec (120°C) | ○ | ○ | × | ≥ 3000 |
| | fnn/ PULSE NMR | (120°C) | ○ | ○ | × | < 0.1 |

FIG. 2

| | | | SMP 4 | SMP 5 | SMP 6 | SMP 7 | EVALUATION CRITERIA ○ : Good × : Bad |
|---|---|---|---|---|---|---|---|
| | | BLEND NO. | GKE 107 | GKE 108 | GKE 109 | GKE 110 | |
| CONSTITUENT MATERIAL TYPE | KE5560-U | phr | 100 | 100 | 100 | 100 | |
| | NC7000 | phr | 5 | 5 | 5 | 5 | |
| | EXPANDED GRAPHITE/ PF POWDER | phr | 5 | 10 | 20 | 30 | |
| | VGCF-H | phr | 0 | 0 | 0 | 0 | |
| MATERIAL CHARACTERISTIC (PHYSICAL PROPERTY VALUE) | ATTENUATION | $\tan\delta$ (0°C) | 0.46 | 0.43 | 0.41 | | |
| | | $\tan\delta$ (80°C) | 0.33 | 0.33 | 0.33 | | |
| | SSM G' (STORAGE SHEAR MODULUS G') | G' (0°C) MPa | 23 | 30 | 37 | | |
| | | G' (80°C) MPa | 11 | 13 | 15 | | |
| | | G' (0°C)/G' (80°C) | 2.1 | 2.3 | 2.4 | — | |
| | FATIGUE DURABILITY | NUMBER OF TIMES LOAD 3N/mm | ≥ 55000 | ≥ 24000 | ≥ 18000 | | |
| | T2n/ PULSE NMR | $\mu$ sec (120°C) | 3280 | 3310 | 3200 | | |
| | fnn/ PULSE NMR | (120°C) | 0 | 0 | 0 | | |
| EVALUATION | ATTENUATION | $\tan\delta$ (0°C) | ○ | ○ | ○ | — | ≥ 0.30 |
| | | $\tan\delta$ (80°C) | ○ | ○ | ○ | — | ≥ 0.30 |
| | SSM G' (STORAGE SHEAR MODULUS G') | G' (0°C) | ○ | ○ | ○ | — | ≥ 10 MPa |
| | | G' (80°C) | ○ | ○ | ○ | — | ≥ 5 MPa |
| | | G' (0°C)/G' (80°C) | ○ | ○ | ○ | — | < 3 |
| | FATIGUE DURABILITY | NUMBER OF TIMES LOAD 3N/mm | ○ | ○ | ○ | — | ≥ 1000 TIMES |
| | T2n/ PULSE NMR | $\mu$ sec (120°C) | ○ | ○ | ○ | — | ≥ 3000 |
| | fnn/ PULSE NMR | (120°C) | ○ | ○ | ○ | — | < 0.1 |

FIG. 3

| | | BLEND NO. | SMP 8<br>GKE 121 | SMP 9<br>GKE 111 | SMP 10<br>GKE 112 | EVALUATION CRITERIA<br>○ : Good<br>× : Bad |
|---|---|---|---|---|---|---|
| CONSTITUENT MATERIAL TYPE | KE5560-U | phr | 100 | 100 | 100 | |
| | NC7000 | phr | 5 | 5 | 5 | |
| | EXPANDED GRAPHITE/ PF POWDER | phr | 0 | 0 | 0 | |
| | VGCF-H | phr | 2.5 | 5 | 10 | |
| MATERIAL CHARACTERISTIC (PHYSICAL PROPERTY VALUE) | ATTENUATION | $\tan\delta$ (0°C) | 0.39 | 0.40 | 0.40 | |
| | | $\tan\delta$ (80°C) | 0.26 | 0.30 | 0.30 | |
| | SSM G' (STORAGE SHEAR MODULUS G') | G' (0°C) MPa | 18 | 22 | 28 | |
| | | G' (80°C) MPa | 9 | 11 | 13 | |
| | | G' (0°C)/G' (80°C) | 2.0 | 2.1 | 2.2 | |
| | FATIGUE DURABILITY | NUMBER OF TIMES LOAD 3N/mm | 16000 | ≥ 51000 | ≥ 18000 | |
| | T2n/ PULSE NMR | μ sec (120°C) | 2750 | 3240 | 3240 | |
| | fnn/ PULSE NMR | (120°C) | 0 | 0 | 0 | |
| EVALUATION | ATTENUATION | $\tan\delta$ (0°C) | ○ | ○ | ○ | ≥ 0.30 |
| | | $\tan\delta$ (80°C) | × | ○ | ○ | ≥ 0.30 |
| | SSM G' (STORAGE SHEAR MODULUS G') | G' (0°C) | ○ | ○ | ○ | ≥ 10 MPa |
| | | G' (80°C) | ○ | ○ | ○ | ≥ 5 MPa |
| | | G' (0°C)/G' (80°C) | ○ | ○ | ○ | < 3 |
| | FATIGUE DURABILITY | NUMBER OF TIMES LOAD 3N/mm | ○ | ○ | ○ | ≥ 1000 TIMES |
| | T2n/ PULSE NMR | μ sec (120°C) | × | ○ | ○ | ≥ 3000 |
| | fnn/ PULSE NMR | (120°C) | × | ○ | ○ | < 0.1 |

FIG. 4

| | | | BLEND NO. | SMP 11<br>GKE 113 | SMP 12<br>GKE 122 | EVALUATION CRITERIA<br>○ : Good<br>× : Bad |
|---|---|---|---|---|---|---|
| CONSTITUENT MATERIAL TYPE | | KE5560-U | phr | 100 | 100 | |
| | | NC7000 | phr | 5 | 5 | |
| | | EXPANDED GRAPHITE/ PF POWDER | phr | | | |
| | | VGCF-H | phr | 15 | 30 | |
| MATERIAL CHARACTERISTIC (PHYSICAL PROPERTY VALUE) | ATTENUATION | | tan δ (0°C) | 0.39 | | |
| | | | tan δ (80°C) | 0.30 | | |
| | SSM G' (STORAGE SHEAR MODULUS G') | | G' (0°C) MPa | 34 | | |
| | | | G' (80°C) MPa | 15 | | |
| | | | G' (0°C)/G' (80°C) | 2.3 | — | |
| | FATIGUE DURABILITY | | NUMBER OF TIMES LOAD 3N/mm | ≥ 67000 | | |
| | T2n/ PULSE NMR | | μ sec (120°C) | 3370 | | |
| | fnn/ PULSE NMR | | (120°C) | 0 | | |
| EVALUATION | ATTENUATION | | tan δ (0°C) | ○ | — | ≥ 0.30 |
| | | | tan δ (80°C) | ○ | — | ≥ 0.30 |
| | SSM G' (STORAGE SHEAR MODULUS G') | | G' (0°C) | ○ | — | ≥ 10 MPa |
| | | | G' (80°C) | ○ | — | ≥ 5 MPa |
| | | | G' (0°C)/G' (80°C) | ○ | — | < 3 |
| | FATIGUE DURABILITY | | NUMBER OF TIMES LOAD 3N/mm | ○ | — | ≥ 1000 TIMES |
| | T2n/ PULSE NMR | | μ sec (120°C) | ○ | — | ≥ 3000 |
| | fnn/ PULSE NMR | | (120°C) | ○ | — | < 0.1 |

FIG. 5

| | | BLEND NO. | CMP CA<br>GKE 00-3<br>NEAT POLYMER | CMP CB<br>GKE 98<br>CNT ONLY | EVALUATION CRITERIA<br>○ : Good<br>× : Bad |
|---|---|---|---|---|---|
| CONSTITUENT MATERIAL TYPE | KE5560-U | phr | 100 | 100 | |
| | NC7000 | phr | | 5 | |
| | EXPANDED GRAPHITE/ PF POWDER | phr | | | |
| | VGCF-H | phr | | | |
| MATERIAL CHARACTERISTIC (PHYSICAL PROPERTY VALUE) | ATTENUATION | tan δ (0°C) | 0.43 | 0.38 | |
| | | tan δ (80°C) | 0.28 | 0.27 | |
| | SSM G' (STORAGE SHEAR MODULUS G') | G' (0°C) MPa | 5 | 19 | |
| | | G' (80°C) MPa | 2 | 8 | |
| | | G' (0°C)/G' (80°C) | 2.5 | 2.4 | |
| | FATIGUE DURABILITY | NUMBER OF TIMES LOAD 3N/mm | 1 | 13200 | |
| | T2n/ PULSE NMR | μ sec (120°C) | 3630 | 2860 | |
| | fnn/ PULSE NMR | (120°C) | 0.21 | 0.19 | |
| EVALUATION | ATTENUATION | tan δ (0°C) | ○ | ○ | ≥ 0.30 |
| | | tan δ (80°C) | × | × | ≥ 0.30 |
| | SSM G' (STORAGE SHEAR MODULUS G') | G' (0°C) | × | ○ | ≥ 10 MPa |
| | | G' (80°C) | × | ○ | ≥ 5 MPa |
| | | G' (0°C)/G' (80°C) | ○ | ○ | < 3 |
| | FATIGUE DURABILITY | NUMBER OF TIMES LOAD 3N/mm | × | ○ | ≥ 1000 TIMES |
| | T2n/ PULSE NMR | μ sec (120°C) | ○ | × | ≥ 3000 |
| | fnn/ PULSE NMR | (120°C) | × | × | < 0.1 |

FIG. 6

| | | BLEND NO. | CMP CC / GKE 11 / CNT ONLY | CMP CD / GKE 84 / BLENDED GRAPHITE ONLY | EVALUATION CRITERIA ○ : Good × : Bad |
|---|---|---|---|---|---|
| CONSTITUENT MATERIAL TYPE | KE5560-U | phr | 100 | 100 | |
| | NC7000 | phr | 10 | | |
| | EXPANDED GRAPHITE/ PF POWDER | phr | | 10 | |
| | VGCF-H | phr | | | |
| MATERIAL CHARACTERISTIC (PHYSICAL PROPERTY VALUE) | ATTENUATION | tan δ (0°C) | 0.25 | 0.5 | |
| | | tan δ (80°C) | 0.23 | 0.33 | |
| | SSM G' (STORAGE SHEAR MODULUS G') | G' (0°C) MPa | 64 | 7 | |
| | | G' (80°C) MPa | 27 | 3 | |
| | | G' (0°C)/G' (80°C) | 2.4 | 2.3 | |
| | FATIGUE DURABILITY | NUMBER OF TIMES LOAD 3N/mm | ≥ 80000 | 127 | |
| | T2n/ PULSE NMR | μ sec (120°C) | 2310 | 3480 | |
| | fnn/ PULSE NMR | (120°C) | 0 | 0.18 | |
| EVALUATION | ATTENUATION | tan δ (0°C) | × | ○ | ≥ 0.30 |
| | | tan δ (80°C) | × | ○ | ≥ 0.30 |
| | SSM G' (STORAGE SHEAR MODULUS G') | G' (0°C) | ○ | × | ≥ 10 MPa |
| | | G' (80°C) | ○ | × | ≥ 5 MPa |
| | | G' (0°C)/G' (80°C) | ○ | ○ | < 3 |
| | FATIGUE DURABILITY | NUMBER OF TIMES LOAD 3N/mm | ○ | × | ≥ 1000 TIMES |
| | T2n/ PULSE NMR | μ sec (120°C) | × | ○ | ≥ 3000 |
| | fnn/ PULSE NMR | (120°C) | ○ | × | < 0.1 |

FIG. 13
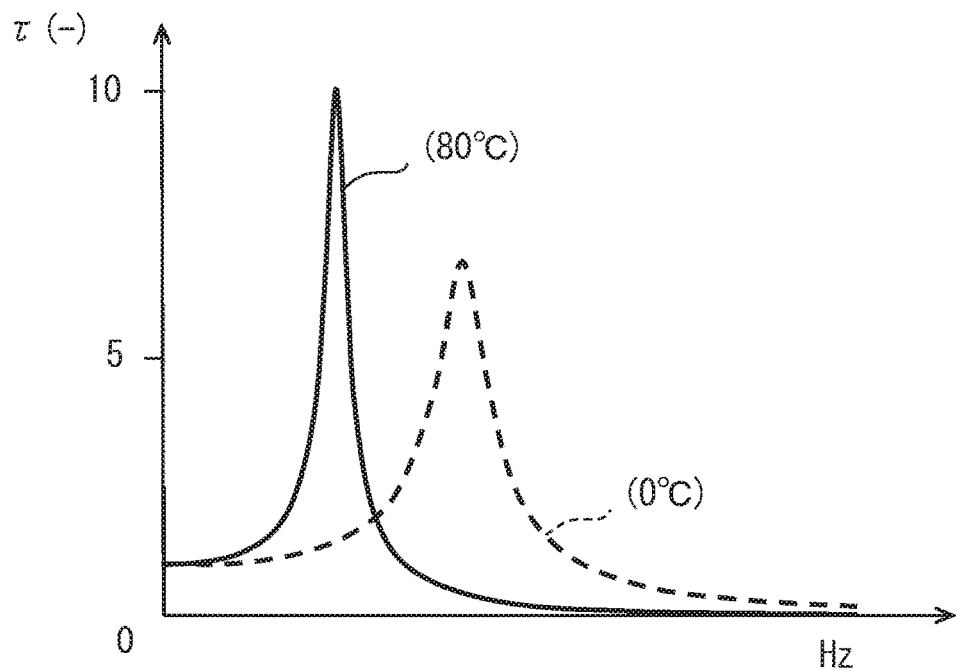
FIG. 14
$$(1)\ fn = \frac{1}{2\pi}\sqrt{\frac{K}{m}} \quad (2)\ K = \alpha G' \quad (3)\ \tau = \frac{\sqrt{1 + \tan^2 \delta}}{\sqrt{\left(1 - \frac{f^2}{f_n^2}\right)^2 + \tan^2 \delta}}$$
FIG. 15
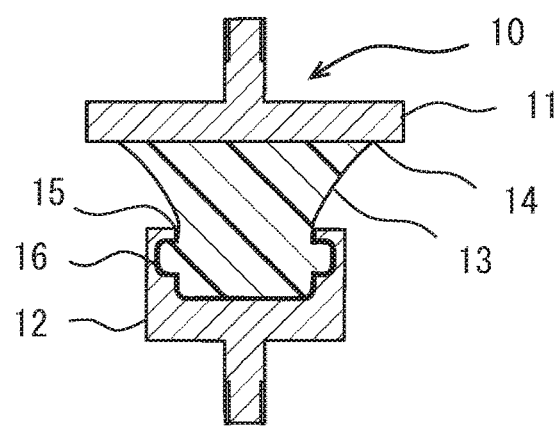

SILICONE RUBBER COMPOSITE MATERIAL AND VIBRATION ISOLATING MEMBER

CROSS-REFERENCE OF RELATED APPLICATIONS

This application is a U.S. National Phase Application under 35 U.S.C. 371 of International Application No. PCT/JP2018/026265 filed on Jul. 12, 2018. This application is based on and claims the benefit of priority from Japanese Patent Application No. 2017-161570 filed on Aug. 24, 2017. The entire disclosures of all of the above applications are incorporated herein by reference.

TECHNICAL FIELD

The present disclosure relates to a silicone rubber composite material and a vibration isolating member.

BACKGROUND ART

Patent Literature 1 discloses a rubber member. This technology is based on ethylene propylene rubber (EPDM). On this basis, there is provided a rubber member for a damper having a large loss tangent (tan δ) from a low temperature region to a high temperature region.

Patent Literatures 2 to 7 disclose composite materials comprising carbon nanotubes or carbon fibers and elastomers, and their production methods. It is known that these materials exhibit various characteristics by nanonization of substances. Such characteristics are called a nanosize effect as described in Patent Literature 8. Patent Literature 9 discloses an example of a use of a rubber member.

The contents of the prior art literatures listed as the prior art are incorporated herein by reference, for the description of technical elements in this specification.

PRIOR ART LITERATURE

Patent Literature

Patent Literature 1: JP 2007-9073A
Patent Literature 2: JP 5844064B
Patent Literature 3: JP 4456576B
Patent Literature 4: JP 4394659B
Patent Literature 5: JP 5670817B
Patent Literature 6: JP 5763991B
Patent Literature 7: JP 5639329B
Patent Literature 8: JP 2005-52179A
Patent Literature 9: JP 2010-138949A

SUMMARY OF THE INVENTION

In the prior art, temperature dependence of elastic modulus is large. That is, there is a large change in natural frequency with respect to a change in material temperature. In this case, it may be impossible to satisfy a required characteristic for at least one use expected of a composite material.

For example, a silicone rubber composite material is required to provide high damping capability in some cases. In other words, it is required to provide a large loss tangent in some cases.

Also, a silicone rubber composite material is required to have durability in some cases. In other words, it is required to maintain performance for a long time in a natural environment in some cases.

Further, the temperature of a silicone rubber composite material varies depending on various factors, such as its use environment, external heat, and self-heating caused by use. For this reason, a silicone rubber composite material is required to have small temperature dependence of its performance in some cases. In particular, elastic modulus, which is a major performance factor, is required to have small temperature dependence in some cases.

From the above-mentioned viewpoints or other viewpoints not mentioned, there is a need for further improvement in a silicone rubber composite material and a vibration isolating member.

It is a first object of the present disclosure to provide a silicone rubber composite material and a vibration isolating member that have small temperature dependence of loss tangent and elastic modulus and further have high durability.

It is a second object of the present disclosure to provide a silicone rubber composite material and a vibration isolating member that are capable of maintaining large loss tangent and large elastic modulus in a wide temperature range and that further have high durability.

In a first aspect of the present disclosure, a silicone rubber composite material comprises: silicone rubber; first carbon nanotubes having an average diameter of not more than 30 nm; and second carbon nanotubes having an average diameter of more than 30 nm and not more than 1000 nm. Per 100 parts by weight of the silicone rubber, the silicone rubber composite material comprises 2.5 to 10 parts by weight (both inclusive) of the first carbon nanotubes and 5 to 15 parts by weight (both inclusive) of the second carbon nanotubes.

With the silicone rubber composite material in the first aspect of the present disclosure, there is provides a silicone rubber composite material that has small temperature dependence of loss tangent and elastic modulus due to the second carbon nanotubes and that further has high durability.

In a second aspect of the present disclosure, a vibration isolating member is shaped to have a natural frequency of 100 Hz or less at 25° C., and the silicone rubber composite material in the first aspect of the present disclosure is fixed to a metal member by baking or press-fitting without a member enclosing the silicone rubber composite material.

With the vibration isolating member in the second aspect of the present disclosure, there is provided a vibration isolating member that has small temperature dependence of loss tangent and elastic modulus due to the second carbon nanotubes and that further has high durability.

BRIEF DESCRIPTION OF THE DRAWINGS

The above and other objects, features and advantages of the present disclosure will become more apparent from the following detailed description made with reference to the accompanying drawings.

FIG. 1 is a diagram showing compositions of materials studied.

FIG. 2 is a diagram showing compositions of materials studied.

FIG. 3 is a diagram showing compositions of materials studied.

FIG. 4 is a diagram showing compositions of materials studied.

FIG. 5 is a diagram showing compositions of materials studied.

FIG. 6 is a diagram showing compositions of materials studied.

FIG. 13 is a graph showing an example of a vibration transmission characteristic.

FIG. 14 is a diagram showing a group of mathematical expressions for calculating a vibration transmission characteristic.

FIG. 15 is a sectional view showing an application example 1.

MODES FOR CARRYING OUT THE INVENTION

Figure 7:
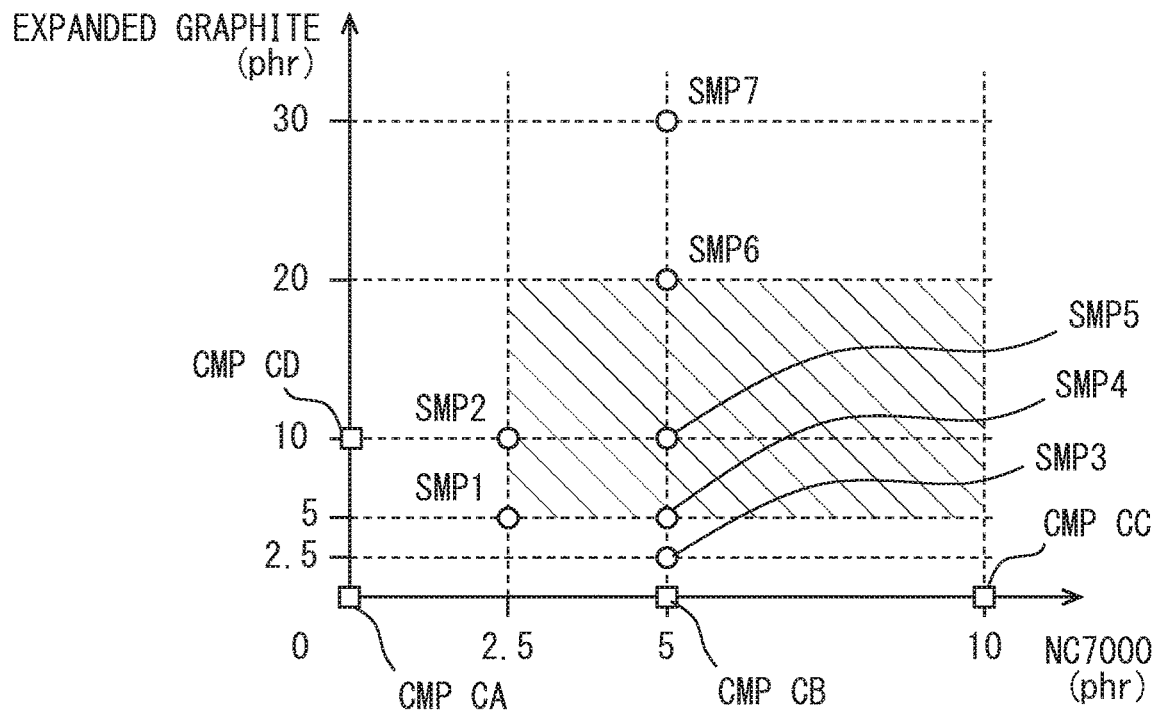
FIG. 7 is a graph where a plurality of samples are plotted.

Embodiments and application examples will be described with reference to the drawings. In the embodiments and the application examples, functionally and/or structurally corresponding portions and/or associated portions may be provided with the same reference signs or with reference numerals in which hundred's digits or higher digits are different. For corresponding portions and/or associated portions, it is possible to refer to the description of another embodiment and application example.

First Embodiment

In this embodiment, a silicone rubber composite material comprises silicone rubber, carbon nanotubes (hereinafter, referred to as CNTs) having an average diameter of 30 nm or less, and graphite pieces. One example of the silicone rubber is silicone rubber KE-5560-U manufactured by Shin-Etsu Chemical Co., Ltd.

CNT has the nanosize effect. With regard to the nanosize effect, Patent Literature 8 is incorporated herein by reference. The CNTs having the nanosize effect is hereinafter referred to as first CNTs. The first CNTs have an average diameter capable of exhibiting the nanosize effect. The average diameter of the first CNTs may be not less than 1 nm and not more than 20 nms. An example of the first CNTs is NC7000 manufactured by Nanocyl.

The silicone rubber, the first CNTs, and the small graphite pieces are kneaded. With regard to kneading of these, Patent Literature 1 and Patent Literature 2 are incorporated herein by reference. These are elastic kneading methods using rolls and defibrate CNTs.

Per 100 parts by weight of the silicone rubber, the first CNTs are 2.5 to 10 parts by weight (both inclusive). In other words, the first CNTs are not less than 2.5 phr and not more than 10 phr. If a blend amount of the first CNTs is too small, a reinforcing effect is not exhibited. From samples, a lower limit of the first CNTs is provided as 2.5 phr or more. An upper limit of the first CNTs can be a change point to a cellulation region. With regard to a percolation region and the cellulation region, Patent Literature 3, Patent Literature 4, Patent Literature 5, and Patent Literature 6 are incorporated herein by reference. From knowledge of developers regarding a value at which the cellulation region begins, 10 phr or less is derived as the upper limit of the first CNTs.

Per 100 parts by weight of the silicone rubber, the graphite pieces are 5 parts by weight or more. The silicone rubber are kneaded with the graphite pieces and the graphite pieces are less than 30 parts by weight per 100 parts by weight of the silicone rubber. The graphite pieces may be 20 parts by weight or less per 100 parts by weight of the silicone rubber.

The graphite pieces do not provide the nanosize effect, and are expected to have a surface sliding effect using a surface area. The graphite pieces are used to increase only friction, without changing physical properties of the silicone rubber and the first CNTs. From samples, a lower limit of the graphite pieces is 5 phr or more. An upper limit of the graphite pieces is provided as such an amount that the silicone rubber is kneadable with the graphite pieces, and is, for example, less than 30 parts by weight. From samples, the upper limit of the graphite pieces may be 20 phr or more.

The graphite piece is a plate-like carbon substance having a laminated structure of six-membered carbon networks. The plate-like carbon substance comprises at least one of: expanded graphite powder; ground graphite powder; graphene oxide; multilayer oxide graphene; and exfoliated graphene. The plate-like carbon substance may be a mixture comprising at least two of them. The plate-like carbon substance is, for example, expanded graphite powder. The expanded graphite is manufactured by Toyo Carbon Co., Ltd.

Unlike carbon black having a functional group left on the surface, the plate-like carbon substance such as expanded graphite powder has only π electrons because it has a graphene structure. Therefore, even if added, strength is hardly reduced. In this regard, if expanded graphite powder is added too much, it will be in a crumbly state, resulting in poor processability. For this reason, an upper limit of the added amount of the expanded graphite powder is given as such an amount that the silicone rubber is kneadable with the expanded graphite powder, and is, for example, less than 30 parts by weight.

One aspect is a pulsed NMR technique. In this aspect, in the silicone rubber composite material, fine cells are formed by the first CNTs. Furthermore, the pulsed NMR technique according to a Hahn-echo method is used. Spin-spin relaxation times obtained by performing measurement for observed nucleus $^1$H at 120° C. by using the pulsed NMR technique according to the Hahn-echo method include a first spin-spin relaxation time (T2n) and a second spin-spin relaxation time (T2nn). The first spin-spin relaxation time (T2n) is 3000 μs or more, and a fraction of components (fnn) having the second spin-spin relaxation time (T2nn) is less than 0.1. With regard to the spin-spin relaxation times, Patent Literature 3 and Patent Literature 7 are incorporated herein by reference.

In a non-crosslinked state, the measurement by the pulsed NMR technique is performed. Specifically, in the absence of an added crosslinking agent, the measurement by the pulsed NMR technique is performed. When the crosslinking occurs, the measurement becomes impossible due to an influence of the crosslinking. It is noted that when the measurement is performed in the non-crosslinking state although the crosslinking agent is added, a reaction may occur when the temperature is increased for the measurement.

The first spin-spin relaxation time (T2n) is a spin-spin relaxation time of a reticulate chain component. It is preferable that the first spin-spin relaxation time is long and molecular mobility is large. From this viewpoint, it is preferable that the first spin-spin relaxation time is 3000 μs or more. The fraction of the components (fnn) having the second spin-spin relaxation time (T2nn) is a fraction of non-reticulate chain components. The less the non-reticulate chains, the more preferable. From this viewpoint, it is preferable that the fraction of the components is less than 0.1.

One aspect is a loss tangent tan δ. The loss tangent tan δ is known as an index for evaluating elasticity and viscosity. For example, with regard to the loss tangent, Patent Literature 1 is incorporated herein by reference. For a damper for suppressing vibration transmission, it is preferable that the loss tangent tan δ is 0.3 or more. Moreover, it is preferable to stably maintain the above value over a wide temperature range. From this viewpoint, the loss tangent is 0.3 or more, from 0° C. to 80° C.

One aspect is a storage shear modulus. It is preferable that the silicone rubber composite material exhibits elasticity stably over a wide temperature range. It is required that the storage shear modulus of the silicone rubber composite material at 0° C. is not less than 10 MPa and not more than 100 MPa. It is required that the storage shear modulus of the silicone rubber composite material at 80° C. is not less than 5 MPa and not more than 50 MPa. Furthermore, it is required that a ratio of the storage shear modulus at 0° C. to that at 80° C. of the silicone rubber composite material is 3 or less.

One aspect is fatigue durability. In this embodiment, the fatigue durability is evaluated from tear strength. The fatigue durability is evaluated based on experiments. For example, an initial crack of a predetermined size is formed in a piece of material, and a tensile force is applied in a direction to spread the crack, and the number of times until the fracture is observed. This experiment is performed with respect to multiple linear pressures. For example, an initial crack of several millimeters is formed. Preferably, the silicone rubber composite material has such a strength that the silicone rubber composite material can withstand 1000 pulls or more.

The silicone rubber composite material is usable for a vibration isolating member. In this case, the vibration isolating member is shaped to have the natural frequency of 100 Hz or less at 25° C. The vibration isolating member is fixed to a metal member by baking or press-fitting without a member for enclosing the silicone rubber composite material.

This embodiment uses the silicone rubber composite material which comprises the silicone rubber and the first CNTs having an average diameter of 30 nm or less, wherein per 100 parts by weight of the silicone rubber, the silicone rubber composite material comprises 2.5 to 10 parts by weight of the first CNTs both inclusive. The amount of the first CNTs is in a boundary region between the percolation region and the cellulation region. In this boundary region, there is no excessive increase in the storage shear modulus while a large loss tangent tan δ is obtained.

Further, this embodiment is the silicone rubber composite material which comprises the graphite pieces. The graphite pieces provide damping characteristic improvement and stable temperature dependence. As a result, the silicone rubber composite material having high damping performance, that is, a large loss tangent tan δ, can be obtained. Moreover, the silicone rubber composite material having large strength, that is, large storage shear modulus, can be obtained. Furthermore, the silicone rubber composite material having little temperature dependence of the loss tangent tan δ and the storage shear modulus can be obtained.

Second Embodiment

This embodiment comprises the silicone rubber, the first CNTs having an average diameter of 30 nm or less, and CNTs having an average diameter of more than 30 nm and not more than 1000 nm. This CNTs do not have the nanosize effect, but has the sliding effect of a surface area. This kind of CNTs is hereinafter referred to as second CNTs. Per 100 parts by weight of the silicone rubber, the first CNTs are 2.5 to 10 parts by weight (both inclusive). Per 100 parts by weight of the silicone rubber, the second CNTs are 5 to 15 parts by weigh (both inclusive). An example of the second CNTs is VGCF-H manufactured by Showa Denko K.K.

The graphite pieces of the first embodiment and also the second CNTs are fillers. These fillers generate friction between the polymers and the fillers in the silicone rubber composite material. However, attenuation mechanisms by the fillers, that is, ways of sliding, are different. The graphite pieces such as expanded graphite involve interlayer friction within the graphite. Meanwhile, the second embodiment comprising the first CNTs and the second CNTs involve friction that generates among two or more kinds of CNTs having different diameters.

Sample 1

In FIG. 1, the sample 1 (SMP1) is a silicone rubber composite member comprising 100 phr of the silicone rubber, 2.5 phr of the first CNTs, and 5 phr of the expanded graphite.

Sample 2

The sample 2 (SMP2) is a silicone rubber composite member comprising 100 phr of the silicone rubber, 2.5 phr of the first CNTs, and 10 phr of the expanded graphite.

Sample 3

The sample 3 (SMP3) is a silicone rubber composite member comprising 100 phr of the silicone rubber, 5 phr of the first CNTs, and 2.5 phr of the expanded graphite.

The sample 3 exhibits the loss tangent tan δ of less than 0.3 at 80° C. Moreover, the sample 3 exhibits the first spin-spin relaxation time (T2n) of less than 3000 μs. The sample 3 has the fraction (fnn) of the components of 0.1 or more. According to this, this Sample 3 cannot satisfy the required performance. The sample 3 provides a COMPARATIVE EXAMPLE.

Sample 4

In FIG. 2, the sample 4 (SMP4) is a silicone rubber composite member comprising 100 phr of the silicone rubber, 5 phr of the first CNTs, and 5 phr of the expanded graphite.

Sample 5

The sample 5 (SMP5) is a silicone rubber composite member comprising 100 phr of the silicone rubber, 5 phr of the firsts CNT, and 10 phr of the expanded graphite.

Sample 6

The sample 6 (SMP6) is a silicone rubber composite member comprising 100 phr of the silicone rubber, 5 phr of the first CNTs, and 20 phr of the expanded graphite.

The samples 1, 2, 4, 5, and 6 exhibit the loss tangent tan δ of 0.3 or more at both 0° C. and 80° C. The samples 1, 2, 4, 5, and 6 exhibit the SSM of 10 MPa or more at 0° C. and 5 MPa or more at 80° C. Furthermore, the ratio of the SSM at 0° C. to the SSM at 80° C. is less than 3. The samples 1, 2, 4, 5, and 6 exhibit the fatigue durability of 1,000 times or more. The samples 1, 2, 4, 5, and 6 exhibit the first spin-spin relaxation time (T2n) of 3000 μs or more. The samples 1, 2, 4, 5, 6 have the fraction (fnn) of the components of less than 0.1. The samples 1, 2, 4, 5, 6 provide EXAMPLES.

Sample 7

The sample 7 (SMP7) is a silicone rubber composite member comprising 100 phr of the silicone rubber, 5 phr of the first CNTs, and 30 phr of the expanded graphite. In this sample, because of too much expanded graphite, the kneading of the silicone rubber was difficult, so that a sample piece could not be obtained. Since a sample piece was obtained in the sample 6 comprising 20 phr of the expanded graphite, it is considered that there is a limit between 20 phr and 30 phr at which the kneading becomes possible. From this kind of viewpoint, the upper limit of the expanded graphite is less than 30 phr and can be provided as the amount that makes the kneading possible. The sample 7 provides a COMPARATIVE EXAMPLE.

Sample 8

In FIG. 3, the sample 8 (SMP8) is a silicone rubber composite member comprising 100 phr of the silicone rubber, 5 phr of the first CNTs, and 2.5 phr of the second CNTs.

The sample 8 exhibits the loss tangent tan δ of less than 0.3 at 80° C. Moreover, the sample 8 exhibits the first spin-spin relaxation time (T2n) of less than 3000 μs. The sample 8 has the fraction (fnn) of the components of 0.1 or more. According to this, the sample 8 cannot satisfy the required performance. The sample 8 provides a COMPARATIVE EXAMPLE.

Sample 9

The sample 9 (SMP9) is a silicone rubber composite member comprising 100 phr of the silicone rubber, 5 phr of the first CNTs, and 5 phr of the second CNTs.

Sample 10

The sample 10 (SMP10) is a silicone rubber composite member comprising 100 phr of the silicone rubber, 5 phr of the first CNTs, and 10 phr of the second CNTs.

Sample 11

In FIG. 4, the sample 11 (SMP11) is a silicone rubber composite member comprising 100 phr of the silicone rubber, 5 phr of the first CNTs, and 15 phr of the second CNTs.

The samples 9, 10, and 11 exhibit the loss tangent tan δ of 0.3 or more at both 0° C. and 80° C. The samples 9, 10, and 11 exhibit the SSM of 10 MPa or more at 0° C. and 5 MPa or more at 80° C. Furthermore, the ratio of SSM at 0° C. to the SSM at 80° C. is less than 3. The samples 9, 10, and 11 exhibit the fatigue durability of 1,000 times or more. The samples 9, 10, and 11 exhibit the first spin-spin relaxation time (T2n) of 3000 μs or more. The samples 9, 10, 11 have the fraction (fnn) of the components of less than 0.1. The samples 9, 10, 11 provide EXAMPLES.

Sample 12

The sample 12 (SMP12) is a silicone rubber composite member comprising 100 phr of the silicone rubber, 5 phr of the first CNTs, and 30 phr of the second CNTs. In this sample, because the second CNTs was too much, the kneading of the silicone rubber was difficult, so that a sample piece could not be obtained. Because the sample piece was obtained in the sample 11 comprising 15 phr of the second CNTs, it is considered that a limit at which the kneading becomes possible exists between 15 phr and 30 phr. From this kind of viewpoint, the upper limit of the second CNTs is less than 30 phr and can be the amount that makes the kneading possible.

Comparative Example CA

In FIG. 5, the silicone rubber alone is COMPARATIVE EXAMPLE CA (CMP CA). The silicone rubber alone cannot satisfy the performance required for the loss tangent tan δ at 80° C., the SSM at 0° C., the SSM at 80° C., the fatigue durability, and the fraction (fnn) of the components.

Comparative Example CB

The COMPARATIVE EXAMPLE CB (CMP CB) is a silicone rubber composite member comprising 100 phr of the silicone rubber and 5 phr of the first CNTs. The COMPARATIVE EXAMPLE CB cannot satisfy the performance required for the loss tangent tan δ at 80° C., the first spin-spin relaxation time (T2n), and the fraction (fnn) of the components.

Comparative Example CC

In FIG. 6, the COMPARATIVE EXAMPLE CC (CMP CC) is a silicone rubber composite member comprising 100 phr of the silicone rubber and 10 phr of the first CNTs. The COMPARATIVE EXAMPLE CC cannot satisfy the performance required for the loss tangent tan δ at 0° C., the loss tangent tan δ at 80° C., and the first spin-spin relaxation time (T2n).

In the COMPARATIVE EXAMPLE CB and the COMPARATIVE EXAMPLE CC, the first CNTs are considered to be in the boundary region. However, the COMPARATIVE EXAMPLE CB and the COMPARATIVE EXAMPLE CC show that it is difficult to stably provide a large loss tangent tan δ over a wide temperature range.

Comparative Example CD

The COMPARATIVE EXAMPLE CD (CMP CD) is a silicone rubber composite member comprising 100 phr of the silicone rubber and 10 phr of the expanded graphite. The COMPARATIVE EXAMPLE CD cannot satisfy the performance required for the SSM at 0° C., the SSM at 80° C., the fatigue durability, and the fraction (fnn) of the components. The COMPARATIVE EXAMPLE CD shows that the expanded graphite alone hardly satisfies the required performance.

From the above samples 1 to 7 and COMPARATIVE EXAMPLES CA to CD in FIG. 7, it is considered that the silicone rubber composite members can satisfy the required performance in cases of 2.5 or more phr of the first CNTs and 5 or more and 20 or less of the expanded graphite.

Figure 8:
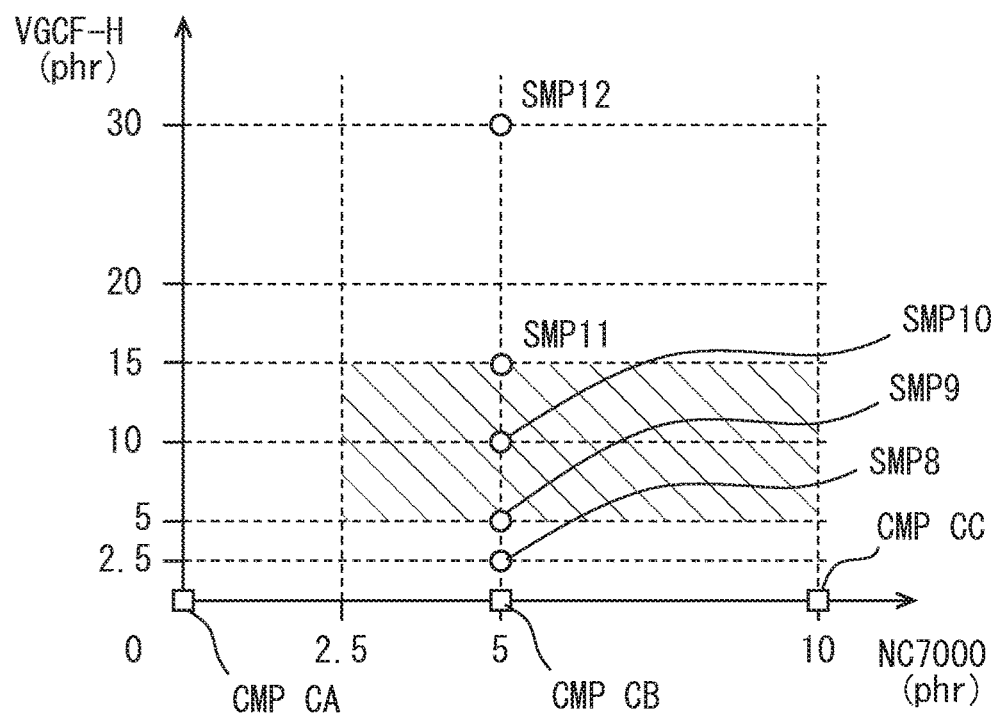
FIG. 8 is a graph where a plurality of samples are plotted.

From the above samples 8 to 12 and COMPARATIVE EXAMPLES CA to CC in FIG. 8, it is considered that the silicone rubber composite members can satisfy the required performance in cases of 2.5 phr of the first CNTs or more and 5 to 15 of the second CNTs (both inclusive).

Figure 9:
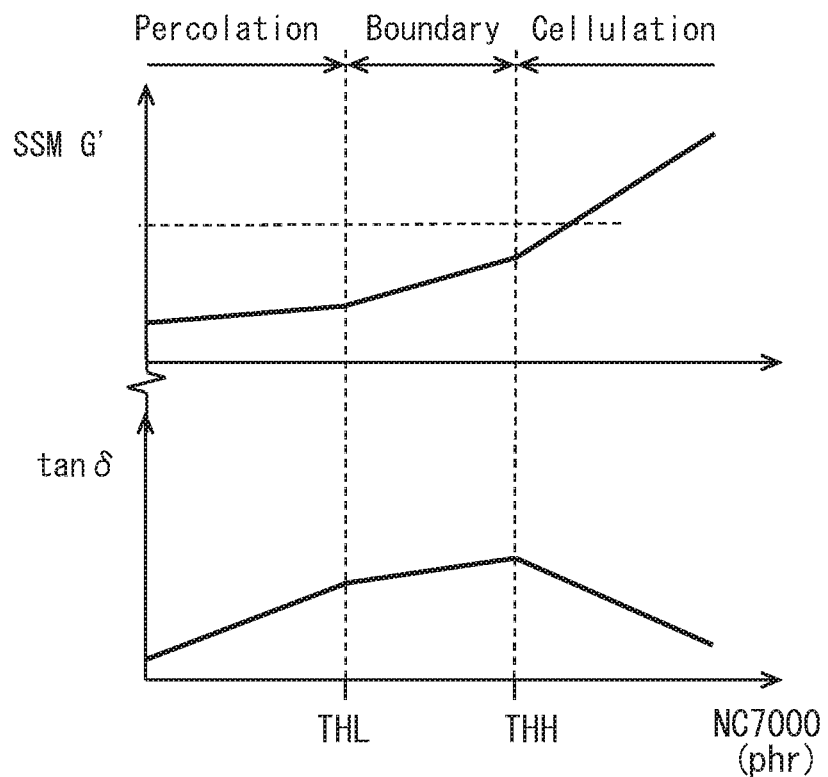
FIG. 9 is a graph showing a boundary region.

FIG. 9 shows the percolation region (Percolation), the boundary region (Voundary), and the cellulation region (Cellulation). The percolation region is a region where, because the CNT added amount is too small, the improvement in the SSM for the added amount is not obtained. Meanwhile, the cellulation region is a region where the loss tangent tan δ is reduced because the CNT added amount is too large.

In order to efficiently increase the loss tangent tan δ due to the added amount of the first CNTs, it is preferable that the added amount of the first CNTs is in the boundary region. Specifically, it is preferable that the added amount of the first CNTs is between a lower threshold THL and an upper threshold THH. The above-described samples indicate these thresholds.

Figure 10:
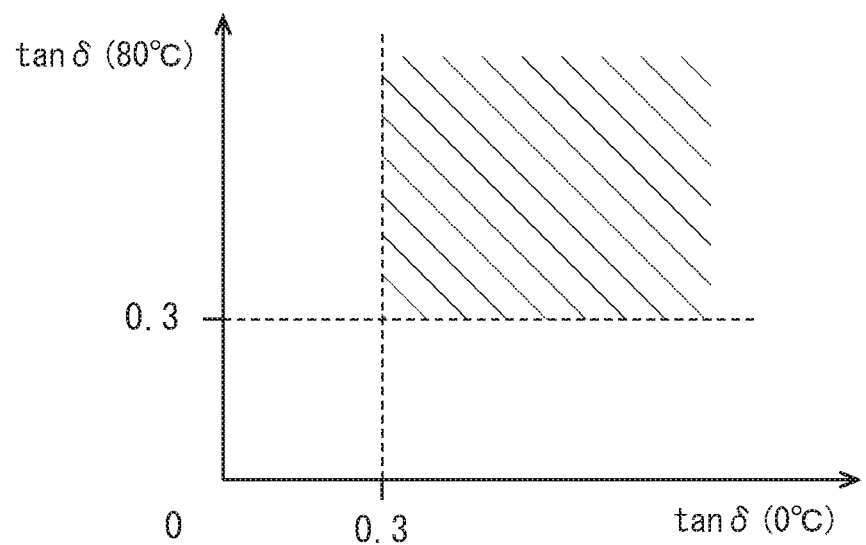
FIG. 10 is a graph showing a range of loss tangent.

FIG. 10 illustrates the evaluation criterion of the loss tangent tan δ. It is preferable that the loss tangent is 0.3 or more at 0° C. and also at 80° C. These temperatures are slightly adjusted according to application example of the silicone rubber composite member.

Figure 11:
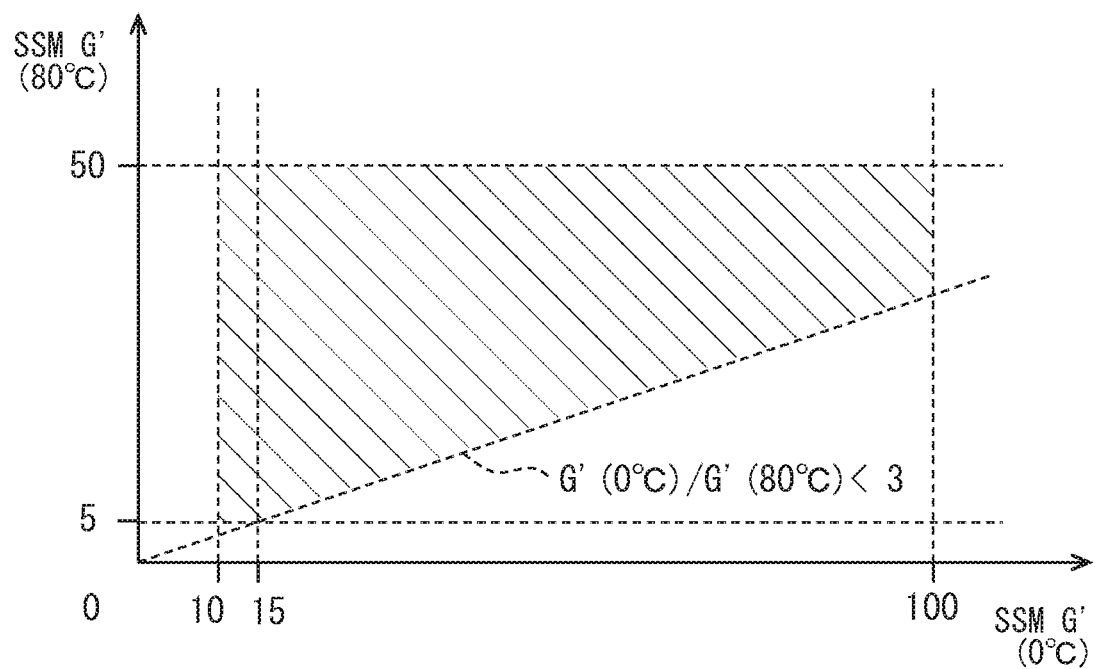
FIG. 11 is a graph showing a range of storage shear modulus.

FIG. 11 show SSM evaluation criteria. It is preferable that at 0° C., the SSM is 10 to 100 MPa (both inclusive). It is preferable that at 80° C., the SSM is 5 to 50 MPa (both inclusive). Furthermore, it is preferable that the ratio of the SSMs, that is, G'(0° C.)/G' (80° C.), is less than 3.

Figure 12:
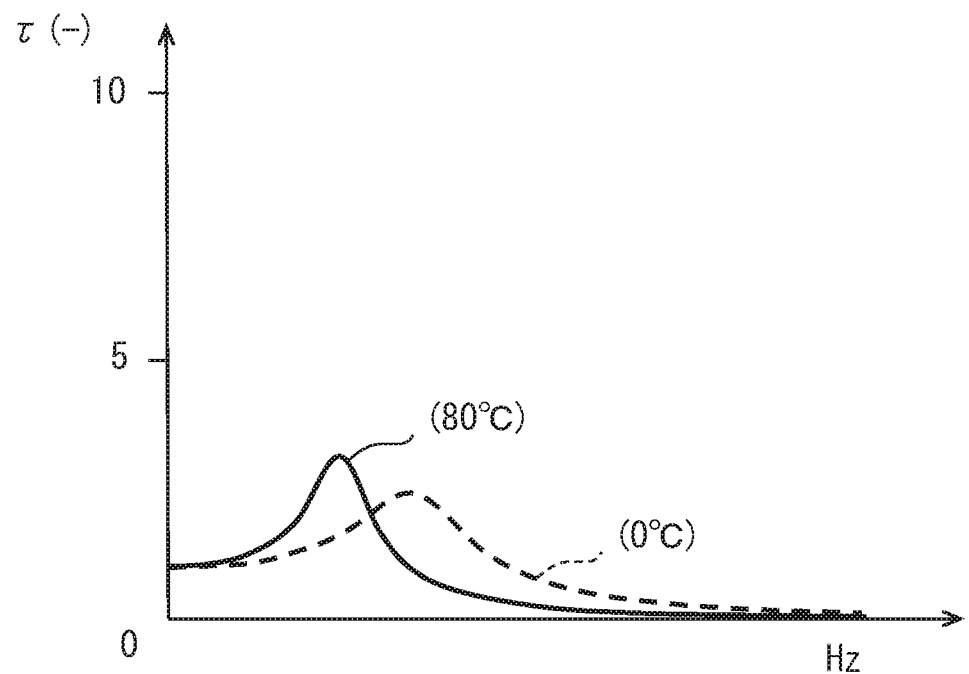
FIG. 12 is a graph showing an example of a vibration transmission characteristic.

FIG. 12 shows a vibration transmission characteristic of one EXAMPLE. FIG. 13 shows a vibration transmission characteristic of EPDM (ethylene propylene diene rubber). FIG. 14 shows a group of relation expressions for deriving these vibration transmission characteristics. In this regard, fn is the natural frequency, f is the frequency of vibration, K is the spring constant, m is the mass, G' is the shear modulus, α is a coefficient that is set according to part shape of material, and τ is the vibration transmissibility. The relationship between the frequency f and the vibration transmissibility τ is provided by substitution of the shear modulus G' and the loss tangent tan δ at respective temperatures.

Comparing FIG. 12 and FIG. 13 makes clear a difference between the silicone rubber composite member of the EXAMPLE and the EPDM. In the EXAMPLE, the large loss tangent tan δ is obtained over a wide temperature range. For this reason, amplification of vibration can be suppressed in a low frequency region. In the EXAMPLE, because there is a small change in the natural frequency in a wide temperature range, resonance with another component can be avoided. In the EXAMPLE, when the temperature decreases, there is a small increase in the natural frequency, so that the vibration can be attenuated in a high frequency region even at low temperatures.

Application Example 1

In FIG. 15, a vibration isolating member 10 is disposed between two members having different vibration states. The two members are, for example, a vibration source and a support member that supports the vibration source. The two members may be a vibration source and another member that is supported by the vibration source. The vibration isolating member 10 suppresses transmission of vibration between the two members. The vibration isolating member 10 absorbs the vibration to be transmitted. The vibration isolating member 10 suppresses vibration of any one of the two members.

The vibration isolating member 10 comprises a first fixing portion 11 fixed to one member and a second fixing portion 12 fixed to the other member. The first fixing portion 11 and the second fixing portion 12 are made of aluminum-based or iron-based metal. The vibration isolating member 10 comprises a silicone rubber composite material 13 disposed between the first fixing portion 11 and the second fixing portion 12. The silicone rubber composite material 13 is also called a high-damping material. The silicone rubber composite material 13 is provided by a plurality of foregoing application examples.

In one application example, the silicone rubber composite material 13 itself is exposed to natural environments. Specifically, the silicone rubber composite material 13 is exposed to the atmosphere and is exposed to rains. Even in such environments, the silicone rubber composite material 13 satisfies durability requirements that differ on a use-by-use basis.

The overall shape of the vibration isolating member 10 is such a shape that the natural frequency at 25° C. is 100 Hz or less. This is the natural frequency of the shape that is commonly used for vibration damping.

The silicone rubber composite material 13 can be fixed by various ways including baking and press fitting. The silicone rubber composite material 13 is fixed to the first fixing portion 11 by baking 14, without using a member for enclosing the silicone rubber composite material 13. The silicone rubber composite material 13 is fixed to the second fixing part 12 by press fitting 15, without using a member for enclosing the silicone rubber composite material 13. The silicone rubber composite material 13 is, by press fitting 15, fitted into a fitting portion 16 formed on the second fixing portion 12.

Application Example 2

This application example is a modification example based on the foregoing application example. In the foregoing application example, the silicone rubber composite material 13 is exposed. As an alternative to this, a silicone rubber composite material 13 in a vibration isolating member 10 of this application example is not exposed.

Figure 16:
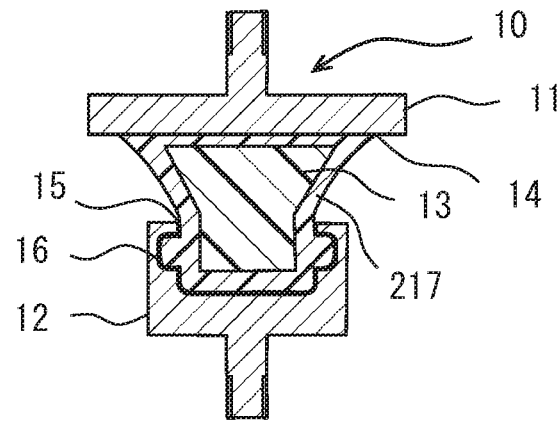
FIG. 16 is a sectional view showing an application example 2.

In FIG. 16, the vibration isolating member 10 comprises a surface layer 217. The surface layer 217 covers the silicone rubber composite material 13. The surface layer 217 provides a container for enclosing the silicone rubber composite material 13. The surface layer 217 is also a container for shape retention of the silicone rubber composite material 13. The surface layer 217 is also a protective layer for protecting the silicone rubber composite material 13. The vibration isolating member 10 obtains most of its vibration isolating performance from the silicone rubber composite material 13. The surface layer 217 by itself hardly contributes to the vibration isolating performance. The surface layer 217 is provided by a thin elastic material. For example, the surface layer 217 can be provided by rubber or elastomer. As described above, although it is preferable that the silicone rubber composite material 13 is exposed, the presence of the surface layer 217 as in this application example is not excluded.

Application Example 3

Figure 17:
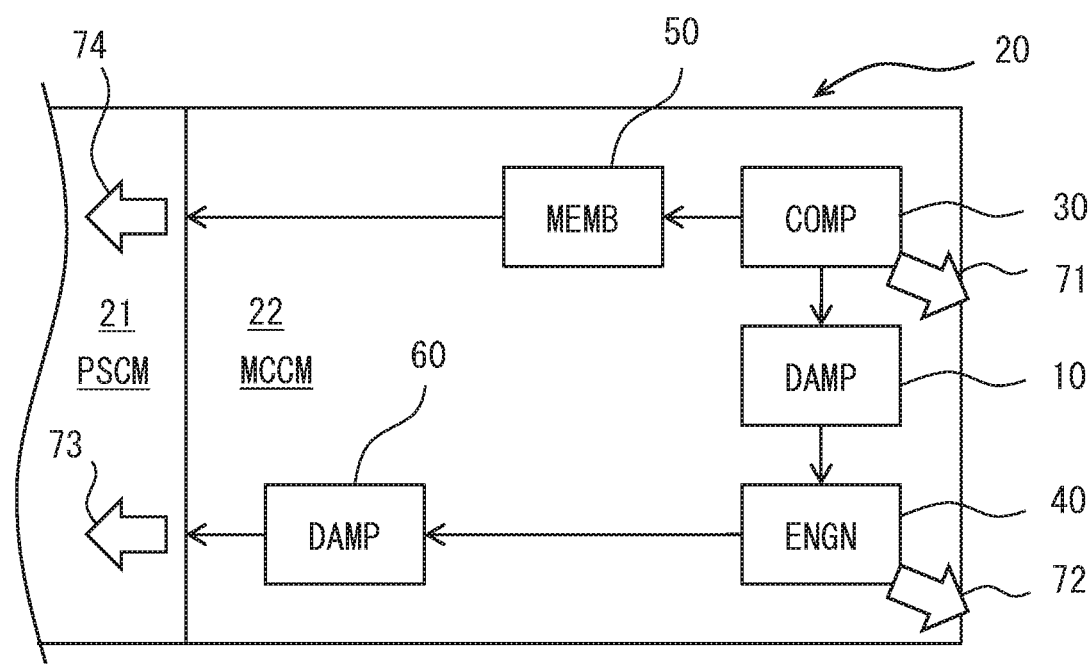
FIG. 17 is a block diagram showing an application example 3.

In FIG. 17, in this application example, a vibration isolating member 10 or a silicone rubber composite material 13 is applied to a vehicle air conditioner. Now, description will be given of transmission of noise and/or vibration in a case where the vibration source is a compressor 30, and further, the vibration source is mounted to an engine 40.

A vehicle 20 has a passenger compartment (PSCM) 21 as a cabin for a person aboard. The vehicle 20 has a machine room (MCCM) 22 for receiving equipment including a vibration source. In the machine room 22, the compressor 30 acting as the vibration source is equipped. The compressor 30 is a component of a refrigeration cycle for the vehicle air conditioner. The compressor 30 is driven by the engine 40. The vibration isolating member 10 is arranged between the compressor 30 and the engine 40. The vibration isolating member 10 fixes the compressor 30 to the engine 40.

The compressor 30 sucks, compresses, and discharges a cooling medium. The compressor 30 is directly and/or indirectly in contact with the vehicle 20 via a plurality of refrigeration cycle components (MEMB) 50. The compressor 30 is directly in contact with the vehicle 20 via a pipe that is one of the components 50. The compressor 30 is indirectly in contact with the vehicle 20 via a cooling medium being fluid and the component 50. For example, it is one of muffler parts 50 that suppresses pulsation of the cooling medium. The compressor 30 is indirectly in contact with the vehicle 20 via a muffler. The engine 40 is in contact with the vehicle 20 via an vibration isolating mechanism 60 for the engine 40.

In cases where the compressor 30 is a vibration source, part of the vibration of the compressor 30 leaks out of the vehicle 20 from the compressor 30 itself as energy 71. The energy 71 is mainly radiated as noise. Part of the energy 71 appears as vibration in the body of the vehicle 20. The vibration of the compressor 30 is transmitted to the engine 40 via the vibration isolating member 10. As a result, the vibration of the compressor 30 becomes energy 72 and leaks out of the vehicle 20 from the engine 40. In this case also, the energy 72 is noise and/or vibration.

Furthermore, the vibration of the compressor 30 is transmitted to the passenger compartment 21 via the engine 40 and the vibration isolating mechanism 60. At this time, the vibration of the compressor 30 becomes energy 73 and leaks to the passenger compartment 21. In this case also, the energy 73 is noise and/or vibration.

The vibration isolating member 10 suppresses amplification of the vibration in a low frequency range by the silicone rubber composite material 13. The vibration isolating member 10 achieves vibration attenuation in a high frequency range by the silicone rubber composite material 13. The vibration isolating member 10 achieves both.

Application Example 4

Figure 18:
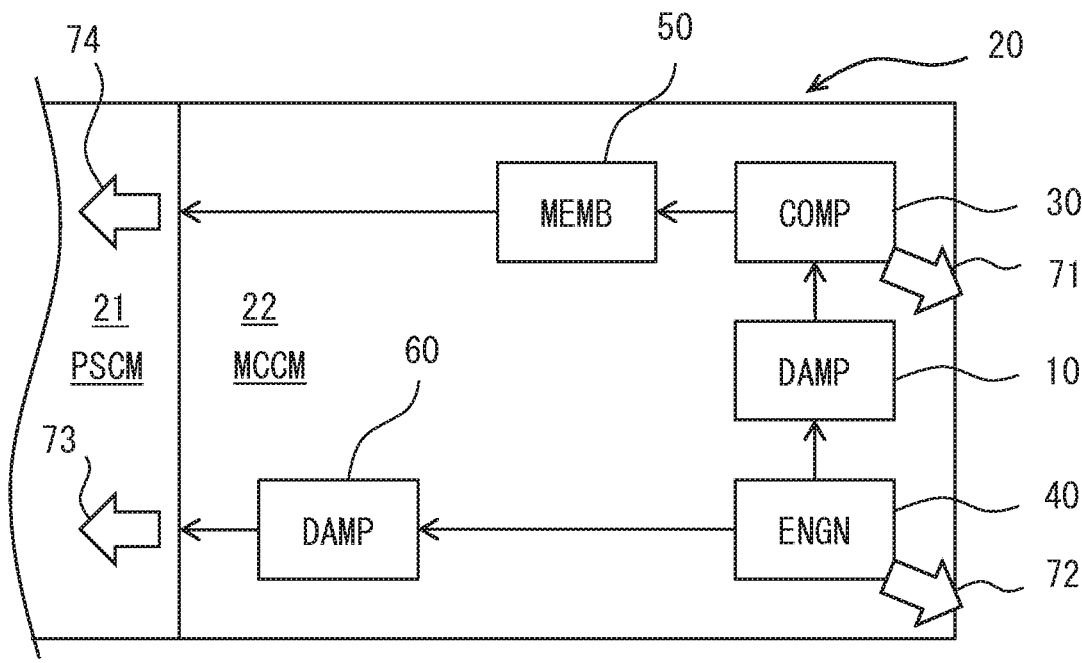
FIG. 18 is a block diagram showing an application example 4.

In FIG. 18, a vibration isolating member 10 or a silicone rubber composite material 13 in this application example is applied to an vehicle air conditioner. Now, transmission of noise and/or vibration in a case where the vibration source is the engine 40 will be described.

In a case where the engine 40 is the vibration source, the vibration of the engine 40 leaks out of the vehicle 20 as energy 72 including noise and/or vibration. Further, the vibration of the engine 40 is transmitted to the compressor 30 via the vibration isolating member 10. Further, the vibration of the engine 40 is transmitted to the components 50 via the vibration isolating member 10 and the compressor 30. As a result, the vibration of the engine 40 leaks out as energy 71, 73, 74.

The vibration isolating member 10 suppresses the transmission of the vibration by the silicone rubber composite material 13. Further, the vibration isolating member 10 suppresses amplification of the vibration in a low frequency range by the silicone rubber composite material 13. When a large acceleration due to the vibration of the engine 40 is applied, the vibration isolating member 10 suppresses destruction of the vibration isolating member 10 itself, the compressor 30, and the component 50.

Application Example 5

Figure 19:
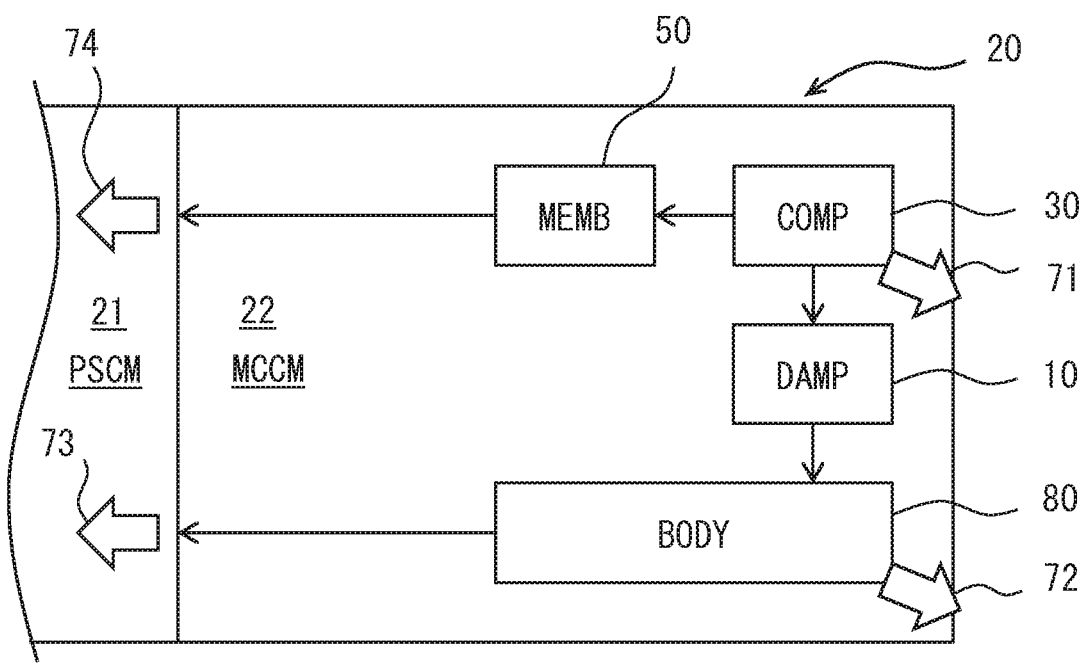
FIG. 19 is a block diagram showing an application example 5.

In FIG. 19, a vibration isolating member 10 or a silicone rubber composite material 13 in this application example is applied to a vehicle air conditioner. Now, transmission of noise and/or vibration in a case where the vibration source is the compressor 30 and the compressor 30 is installed to a body (BODY) 80 of the vehicle 20 will be described. In this case, the vibration of the compressor 30 is transmitted to the body 80 via the vibration isolating member 10 and further transmitted to the passenger compartment 21. Also in this case, the vibration isolating member 10 provides the same operations and effects as in the above-described application examples.

Application Example 6

Figure 20:
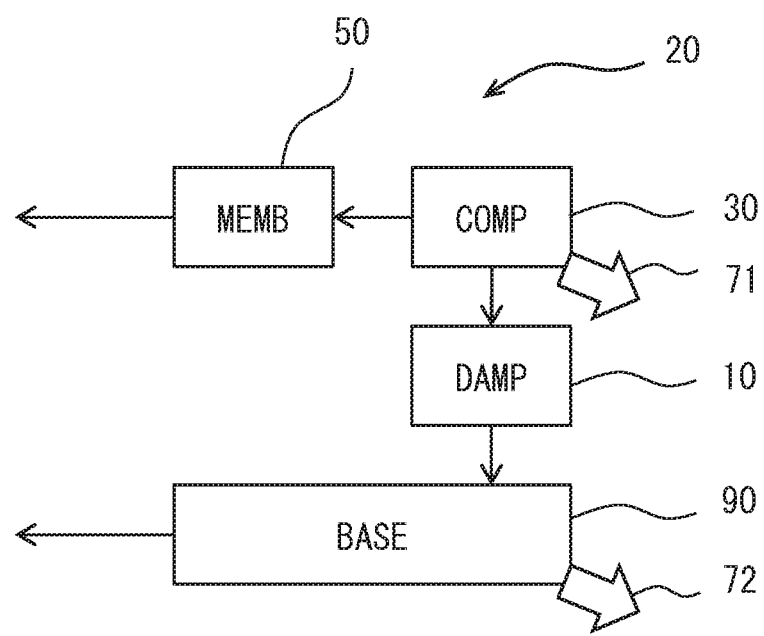
FIG. 20 is a block diagram showing an application example 6.

In FIG. 20, a vibration isolating member 10 or a silicone rubber composite material 13 in this application example is applied to an vehicle air conditioner or a domestic air conditioner. Now, transmission of noise and/or vibration in a case where the vibration source is the compressor 30 and the compressor 30 is installed to a support base (BASE) 90 fixed to the ground will be described. In this case, the vibration of the compressor 30 is transmitted via the component 50 and the support base 90. Also in this case, the vibration isolating member 10 provides the same operations and effects as in the above-described application examples.

Other Application Examples

The disclosure in this specification is not limited to the illustrated application examples. The disclosure encompasses the illustrated application examples and modifications by persons skilled in the art based on the illustrated application examples. For example, the disclosure is not limited to the illustrated combinations of parts and/or elements. The disclosure enables various combinations to put into practice. The disclosure may have additional parts that are addable to the illustrations. The disclosure encompasses omitting parts and/or elements of the illustrations. The disclosure encompasses replacing and combining of parts and/or elements between one illustration and another illustration. Disclosed technical scopes are not limited to the description of the application examples. Some disclosed technical scopes are shown by the description of claims, and are be understood to encompass all modifications within the meanings and scopes equivalent to the description of claims.

The silicone rubber composite member satisfies the above evaluation criteria under the above-mentioned temperature conditions, specifically, 0° C. and 80° C. For this reason, in actual applications, the required performance with respect to the durability in a temperature range of −40° C. to 120° C. is exhibited. Also, the required performance with respect to the attenuation characteristic in a temperature range of −20° C. to 120° C. is exhibited.

The vibration isolating member 10 or the silicone rubber composite material 13 is applicable in technical fields where amplification of vibration is suppressed in a low frequency range and vibration is attenuated in a high frequency range. The vibration isolating member 10 or the silicone rubber composite material 13 is applicable to a wide range of uses.

The application examples include equipment in the field of air conditioning. The application examples include, for example, a vehicle air conditioner (including a refrigerating freezing unit for transportation, a bus air conditioner, etc.), a domestic air conditioner, a commercial air conditioner, an air purifier, a spot cooler, and an electric fan. The application examples include components of these devices. The application examples include a component in a refrigeration cycle in which a flow of cooling medium causes a pipe to vibrate. The application examples include, for example, a compressor, a heat exchanger (a condenser, a radiator, an evaporator, or a heater core), a solenoid valve, a cooling medium pipe, a receiver, an accumulator, an ejector, and an air conditioning unit. The application examples include a component used to blow air. The application examples include, for example, a fan and a blower motor. The application examples include a component used to deliver water, and for example, antifreeze. For example, a water pump and a water pipe are the application examples.

The application examples include an engine-driven compressor and an electric compressor. The vibration isolating member 10 is usable for reducing noise caused by the compressor serving as the vibration source. The vibration isolating member 10 is useable for preventing breakage and/or interference of components or cooling-medium pipes connected to the compressor. These compressors are used for many uses. For example, these are used for an air conditioner, a heat pump type water, a heat pump type warm water floor heater, a refrigerator, a heat pump type washer-dryer, a vending machine, a freezing machine, and a refrigerating freezing showcase.

The application examples include a part of a power system in a vehicle. The application examples include a part that causes collision at a time of valve opening and/or valve closing, a fuel flow, and vibration of electric equipment. The application examples include a generator, a generator for vehicle, an alternator rotated by the engine, and a starter for starting the engine. The application examples include an inverter, a water pump for engine cooling, a fuel pump, a motor, an injector for gasoline, and an injector for diesel. The application examples include a driving safety related part for vehicle. The application examples include, for example, a steering wheel, a transaxle, a transmission, and a body.

The application examples include fields other than vehicles. The application examples include, for example, a heat pump type water heater, its outdoor unit, its tank, a robot part, and house equipment.

The invention claimed is:

1. A silicone rubber composite material comprising:
   silicone rubber;
   first carbon nanotubes having an average diameter of not more than 30 nm; and
   second carbon nanotubes having an average diameter of more than 30 nm and not more than 1000 nm,
   wherein
   the silicone rubber composite material comprises 2.5 to 10 parts by weight (both inclusive) of the first carbon nanotubes and 5 to 15 parts by weight (both inclusive) of the second carbon nanotubes, per 100 parts by weight of the silicone rubber.

2. The silicone rubber composite material according to claim 1, wherein:
   fine cells are formed by the first carbon nanotubes;
   spin-spin relaxation times obtained by performing measurement for observed nucleus $^1$H at 120° C. by using a pulsed NMR technique according to a Hahn-echo method include a first spin-spin relaxation time and a second spin-spin relaxation time;
   the first spin-spin relaxation time is 3000 μs or more; and
   a fraction of components having the second spin-spin relaxation time is less than 0.1.

3. The silicone rubber composite material according to claim 1, wherein:
   the silicone rubber composite material has a loss tangent of 0.3 or more from 0° C. to 80° C.

4. The silicone rubber composite material according to claim 1, wherein:
   the silicone rubber composite material has a storage shear modulus of: 10 to 100 MPa (both inclusive) at 0° C.; and 5 to 50 MPa (both inclusive) at 80° C.; and
   a ratio of the storage shear modulus at 0° C. to that at 80° C. is 3 or less.

5. A vibration isolating member which is shaped to have a natural frequency of 100 Hz or less at 25° C., and in which the silicone rubber composite material according to claim 1 is fixed to a metal member by baking or press-fitting without a member enclosing the silicone rubber composite material.

6. A vibration isolating member comprising:
   the silicone rubber composite material according to claim 1; and
   a metal member to which the silicone rubber composite material is fixed,
   wherein:
   the silicone rubber composite material is exposed to an outside; and
   the vibration isolating member is shaped to have a natural frequency of 100 Hz or less at 25° C.

7. A vibration isolating member comprising:
   the silicone rubber composite material according to claim 1;
   a metal member to which the silicone rubber composite material is fixed; and
   a member enclosing the silicone rubber composite material,
   wherein the vibration isolating member is shaped to have a natural frequency of 100 Hz or less at 25° C.

* * * * *